US010818276B2

(12) United States Patent
May

(10) Patent No.: US 10,818,276 B2
(45) **Date of Patent: *Oct. 27, 2020**

(54) DRUM SUSPENSION APPARATUS

(71) Applicant: Randall May International Incorporated, Irvine, CA (US)

(72) Inventor: Randall L. May, Irvine, CA (US)

(73) Assignee: Randall May International Incorporated, Irvine, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 16/292,191

(22) Filed: Mar. 4, 2019

(65) Prior Publication Data

US 2019/0206374 A1 Jul. 4, 2019

Related U.S. Application Data

(63) Continuation of application No. PCT/US2019/013335, filed on Jan. 11, 2019, and a continuation-in-part of application No. 15/872,718, filed on Jan. 16, 2018, now Pat. No. 10,249,273, which is a continuation of application No. PCT/US2018/013566, filed on Jan. 12, 2018.

(60) Provisional application No. 62/536,402, filed on Jul. 24, 2017, provisional application No. 62/446,207, filed on Jan. 13, 2017.

(51) Int. Cl.

| | |
|---|---|
| ***G01D 13/02*** | (2006.01) |
| ***G10D 13/02*** | (2020.01) |
| ***G10D 13/10*** | (2020.01) |

(52) U.S. Cl.

CPC ............ *G10D 13/02* (2013.01); *G10D 13/28* (2020.02)

(58) Field of Classification Search

CPC .................................................... G10D 13/026

See application file for complete search history.

(56) References Cited

U.S. PATENT DOCUMENTS

| | | | |
|---|---|---|---|
| 2,245,883 A | 6/1941 | Walberg | G10D 13/026 24/569 |
| 3,779,618 A | 12/1973 | Sogila et al. | |
| 3,780,613 A | 12/1973 | Ludwig, Jr. | G10D 13/026 84/421 |
| 4,158,980 A | 6/1979 | Gauger | G10D 13/026 84/421 |
| 4,186,853 A | 2/1980 | Bills | |
| 4,334,458 A | 6/1982 | Grauso | G10D 13/023 84/411 R |

(Continued)

OTHER PUBLICATIONS

PCT/US2018/013566, International Preliminary Report on Patentability (PCT/IB/326 and PCT/IB/373) dated Jul. 25, 2019 (Nine (9) pages).

(Continued)

*Primary Examiner* — Kimberly R Lockett

(74) *Attorney, Agent, or Firm* — Crowell & Moring LLP

(57) ABSTRACT

A percussion instrument mount includes a base that supports a percussion instrument in a playing position. The percussion instrument mount also includes a swing arm that is coupled to the percussion instrument, and is also coupled to the base via a joint such that the swing arm rotates about the joint from an equilibrium position in response to a playing impact on the percussion instrument. The percussion instrument mount still further includes a playing impact energy absorber that provides a restoring force to the swing arm so as to return the swing arm to the equilibrium position.

18 Claims, 15 Drawing Sheets

(56) References Cited

U.S. PATENT DOCUMENTS

| | | | | | |
|---|---|---|---|---|---|
| 4,669,349 | A | 6/1987 | Hyakutake | | |
| 4,753,408 | A | 6/1988 | Wailes | | |
| 4,779,509 | A | 10/1988 | Weir | G10D 13/026 | 84/411 R |
| 5,046,700 | A | 9/1991 | Hoshino | G10D 13/026 | 248/632 |
| 5,140,889 | A | 8/1992 | Segan | G10D 13/024 | 446/408 |
| 5,337,545 | A | 8/1994 | Johnston | G10D 13/026 | 84/421 |
| 5,520,083 | A | 5/1996 | Falkner, Jr. | G10D 13/026 | 84/421 |
| 5,544,561 | A | 8/1996 | Isomi | G10D 13/026 | 224/910 |
| 5,600,080 | A | 2/1997 | Belli | G10D 13/026 | 84/421 |
| 6,102,358 | A | 8/2000 | McLeary | G10D 13/026 | 248/604 |
| 6,195,839 | B1 | 3/2001 | Patterson et al. | | |
| 6,623,015 | B2 | 9/2003 | Schill et al. | | |
| 7,960,634 | B2 | 6/2011 | Gauger | G10D 13/026 | 84/421 |
| 8,237,038 | B2 | 8/2012 | Gauger | G10D 13/026 | 69/19.1 |
| 8,242,343 | B2 | 8/2012 | Jones | G10D 13/026 | 84/421 |
| 9,293,122 | B1 | 3/2016 | Martin | G10D 13/026 | |
| 2005/0274854 | A1 | 12/2005 | May | G10D 13/026 | 248/171 |
| 2010/0307316 | A1 | 12/2010 | Jones | G10D 13/026 | 84/421 |
| 2013/0000460 | A1 | 1/2013 | Johnston | G10D 13/026 | 84/421 |
| 2016/0217775 | A1 | 7/2016 | May | | |

OTHER PUBLICATIONS

PCT/US2018/013566, International Search Report (PCT/ISA/220 and PCT/ISA/210) dated Mar. 29, 2018, enclosing Written Opinion of the International Searching Authority (PCT/ISA/237) (Ten (10) pages).

DRUM SUSPENSION APPARATUS

CROSS REFERENCE TO RELATED APPLICATIONS

This application is a continuation of PCT International Application No. PCT/US19/013335, filed on Jan. 11, 2019.

This application is a continuation-in-part of U.S. application Ser. No. 15/872,718, filed on Jan. 16, 2018. U.S. application Ser. No. 15/872,718 is a continuation of PCT International Application No. PCT/US18/013566, filed Jan. 12, 2018. PCT International Application No. PCT/US18/013566 claims priority to U.S. Appl. No. 62/536,402, filed Jul. 24, 2017, and to U.S. Appl. No. 62/446,207, filed Jan. 13, 2017.

The entire contents of each of the aforementioned applications are hereby expressly incorporated by reference herein.

BACKGROUND OF THE INVENTION

The disclosure relates to improvements in hardware for mounting percussion instruments, namely, acoustic and/or electronic drum suspension hardware.

Electronic percussion instruments are known as alternatives to acoustic drums or other percussion instruments. An electronic percussion instrument typically includes a trigger pad equipped with various sensors designed to sense the features (e.g., location, intensity, etc.) of the playing impact on the trigger pad. These sensors send a corresponding electronic signal via a wire to a sound module that produces synthesized or sampled percussion sounds based on the electronic signal, which sounds are played through speakers connected to the sound module.

Such electronic percussion instruments are known to be mechanically mounted on support structures, e.g., stands or kit frames, so that they may be played similarly to their corresponding acoustic instruments. However, problems arise due to this traditional mounting structure. First, is in that residual vibration from the playing/performing energy may be transferred to the support structure through the traditional ridged mounting hardware. This residual vibration causes interference with the propagating electronic signal, causing the signal to inaccurately reflect the features of the playing impact. The sound produced by the synthesizer is accordingly impacted. Second, the feel and stick response from the electronic trigger pad with ridged mounting structure, is significantly foreign to that of an acoustic drum mounted on a suspension system. Drumhead manufactures have made advancements to better emulate that of an acoustic drum feel and stick response, namely mesh head material. While this material improves the aforementioned feel characteristics, it still falls short of an acoustic drum and also introduced an undesirable trampoline stick response.

Problems also arise due to the traditional mounting of acoustic instruments on support structures. Again, residual vibration transferred to the support structure may negatively impact the sound properties of the acoustic instrument. Moreover, the sound quality may be further negatively impacted because, for traditional mounting, the acoustic boundary conditions vary significantly from mathematically pure boundary conditions due to the fixed nature and relatively static rigidity of traditional mounting. By way of explanation, mostly pure sound quality from a drum requires the drum to be essentially floating on air without any support. The presence of a support introduces a corresponding area that has a different acoustic boundary condition than areas where the support is not. This affects the acoustic properties of the drum and is equally fixed (i.e., non-adjustable), thus results in a compromise to the feel and/or sonic property of the drum.

It is therefore desirable to provide advantages over such systems and further be able to control to the feel, stick response and sonic properties of the instrument. Other features and advantages of the present invention will become apparent from the following more detailed description, taken in conjunction with the accompanying drawings, which illustrate, by way of example, the principles of the presently described embodiments.

DETAILED DESCRIPTION OF THE PREFERRED EMBODIMENTS

Figure 1:
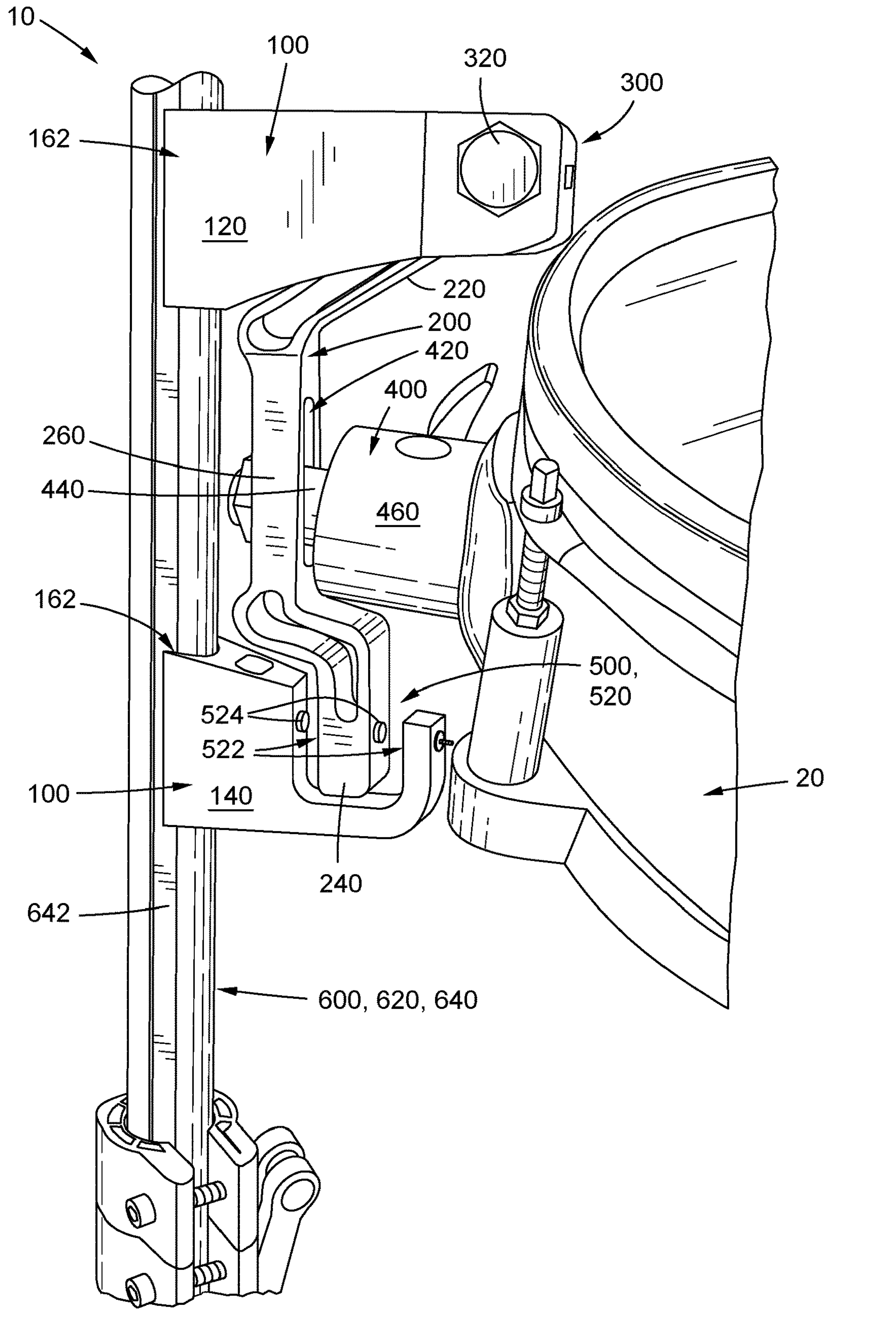
FIG. 1 is a side view of the percussion instrument mount according to at least one embodiment.

The above-described drawing figures illustrate the disclosed invention in at least one of its preferred, best mode embodiments, which are further defined in detail in the following description. Those having ordinary skill in the art may be able to make alterations and modifications to what is described herein without departing from its spirit and scope. While this invention is susceptible of embodiment in many different forms, there is shown in the drawings and will herein be described in detail at least one preferred embodiment of the invention with the understanding that the present disclosure is to be considered as an exemplification of the principles of the invention and is not intended to limit the broad aspects of the invention to any embodiment illustrated. Therefore, it should be understood that what is illustrated is set forth only for the purposes of example and should not be taken as a limitation on the scope of the disclosed invention.

FIGS. 1-10 illustrate exemplary percussion instrument mounts in accordance with aspects of the disclosed invention.

A percussion instrument mount 10 comprises: a base 100 coupled to a swing arm 200 via a joint 300, the swing arm 200 configured to rotate about the joint 300 in response to a playing impact on a percussion instrument 20 coupled to the swing arm 200 via an instrument attachment mechanism 400; and a playing impact energy absorber 500 configured to absorb the rotation of the swing arm 200. The base 100 is also preferably coupled to a support structure 600, such as an instrument stand or kit frame, configured to support the percussion instrument 20 via the percussion instrument mount 10 on a playing surface, e.g., the ground or a stage.

The impact energy absorber 500 preferably absorbs the playing impact by progressively dampening the swing via magnetic field resistance. In particular, the respective strengths and locations of one or more magnets located in the percussion instrument mount 10 produce a magnetic field that defines an equilibrium position for the swing arm 200. Movement of the swing arm 200 away from the equilibrium position (e.g., due to playing impact) is resisted by the magnetic field, which provides a restoring force tending the swing arm 200 back towards the equilibrium position. Mechanical resistance or frictional resistance may also be provided, for example at various points of rotation, so as to dissipate the playing impact energy. Accordingly, playing impact energy transferred from the drum to the base 100 is significantly reduced, if not eliminated altogether.

Turning now to FIGS. 1-4, aspects of the percussion instrument mount 10 will be described in accordance with at least one embodiment.

The base 100 may comprise a first base portion 120 and a second base portion 140 having fixed relative positions with respect to each other. In particular, the first and second base portions may each comprise one or more grip elements 162 configured to secure the first and second base portions respectively to the support structure and/or an intermediate support 620.

The support structure and/or intermediate support preferably comprises at least one rod 640 having at least one longitudinal groove 642 formed therein and configured to accept a corresponding grip element 162 so as to form a sliding joint 160 via which the first and second bases are configured to slide longitudinally along the rod so as to adjust their relative positions with respect to the rod and each other. Moreover, in at least some embodiments, the first and second bases are able to be removably joined with the rod via the sliding joint 160. That is to say that first and second bases may be slid off of and on to the rod via engaging respective grip elements and grooves. In at least some embodiments, each groove and corresponding grip element together form a quasi-dovetail sliding joint, however, other sliding joints may be utilized without departing from the scope of the invention.

Each of the first and second base portions also preferably includes one or more fasteners configured to secure the first and second base portions to the support structure and/or intermediate support in respective fixed positions relative thereto. The fasteners may, for example, comprise threaded fasteners whose contact can be tightened and loosened via screwing and unscrewing the fastener so as to forcibly contact a wall of the support structure and/or intermediate support and thereby provide and remove a frictional staying force.

In some embodiments, the base 100 comprises a unitary base (not shown), including at least one corresponding grip element similarly configured to secure the base 100 to the support structure and/or the intermediate support.

The swing arm 200 may be a substantially rigid integral structure comprising: a first arm portion 220, a second arm portion 240, and a third arm portion 260 integrally connecting the first and second arm portions.

The first arm portion 220 is coupled to the first base portion 120 via the joint 300—and is thereby configured to swing or otherwise rotate about the joint 300 in response to the playing impact on the percussion instrument 20 coupled thereto.

As shown in FIGS. 1-4, the joint 300 is preferably a hinge joint comprising a hinge bolt 320 that couples the first arm portion 220 to the first base portion 120 via respective through-holes 340. The hinge joint may provide mechanical resistance so as to dissipate playing impact energy.

Accordingly, the hinge bolt 320 may further be provided with a deformable sheath 360 positioned between the outer surface of the hinge bolt 320 and the inner surface of the through-hole 340 of the first arm portion 220. To the extent alternative joint constructions are utilized, e.g., ball-and-socket joint, the deformable sheath 360 may engage appropriate pivot point structures of the joint 300.

A pressure exerting element 380 may extend through the first arm portion 220 substantially perpendicular to the through-hole 340 so as to engage with the sheath 360 and exert pressure thereon. This deforms the sheath 360 so as to adjust the frictional resistance to rotation of the hinge bolt 320. The pressure exerting element is preferably a threaded element (e.g., an Allen fastener, etc.) so as to enable control of the amount of pressure—and therefore frictional resistance—applied.

Figure 2:
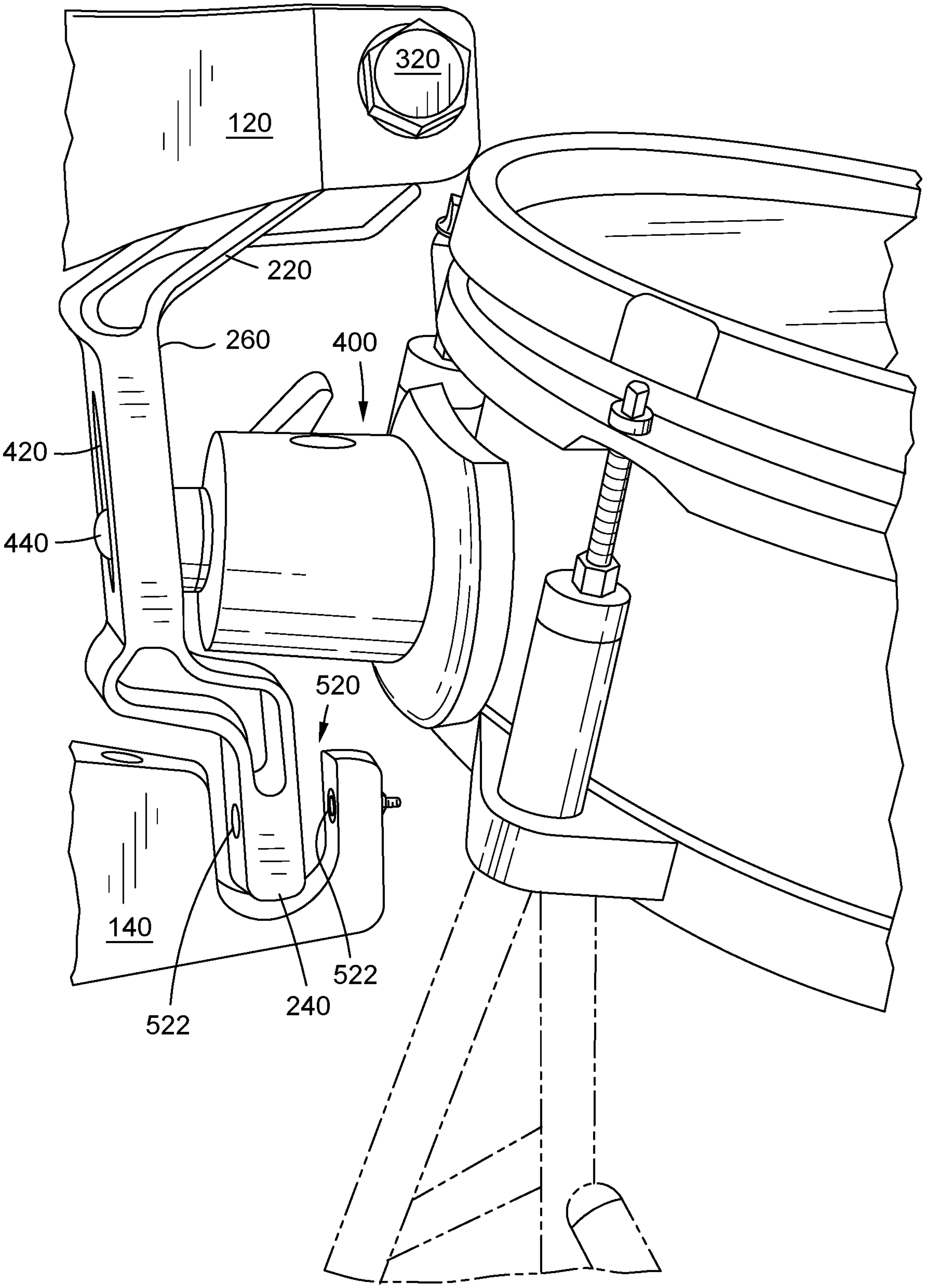
FIG. 2 is a further side view of the percussion instrument mount according to at least one embodiment.
Figure 3:
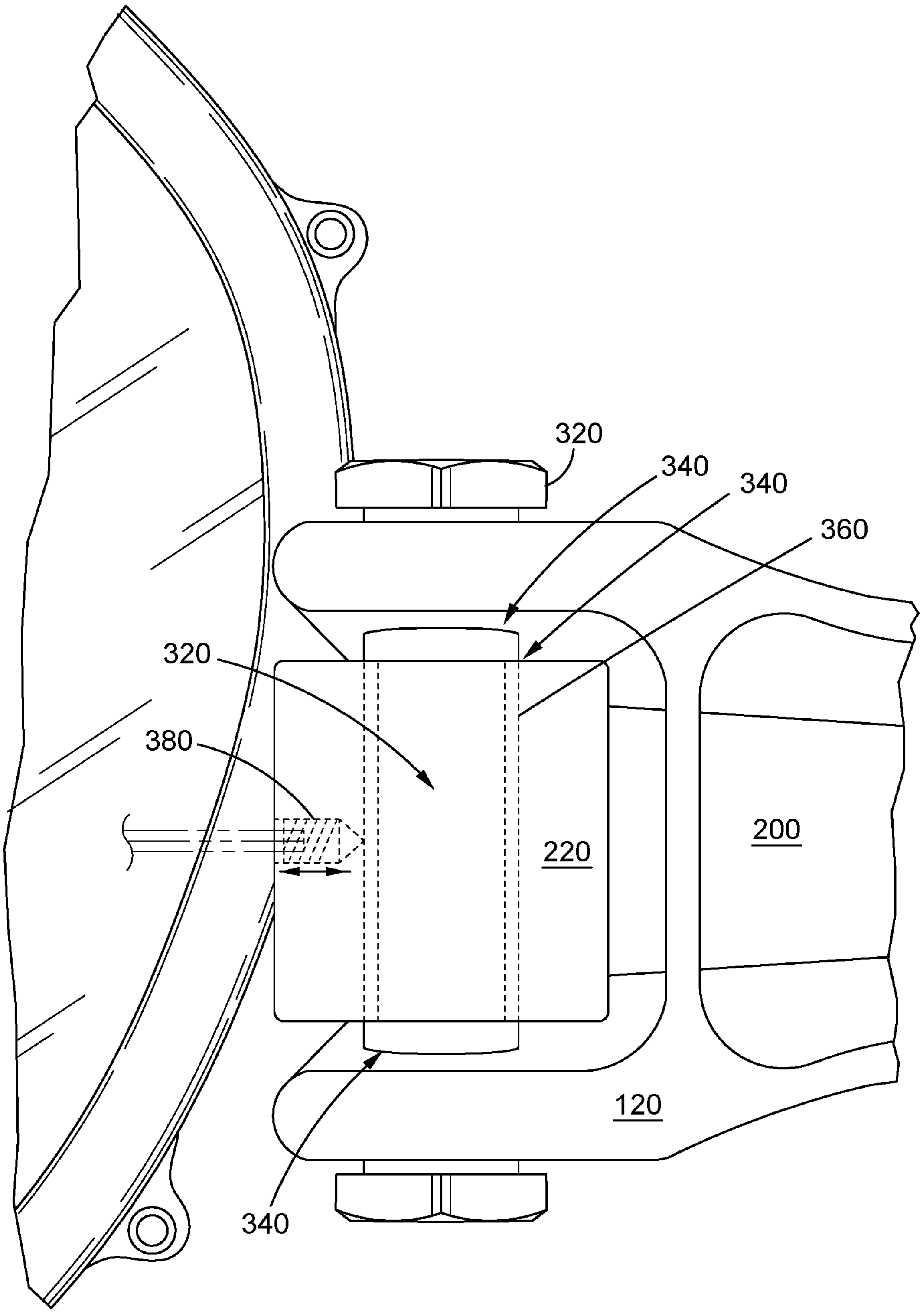
FIG. 3 is a top view of the percussion instrument mount according to at least one embodiment.
Figure 4:
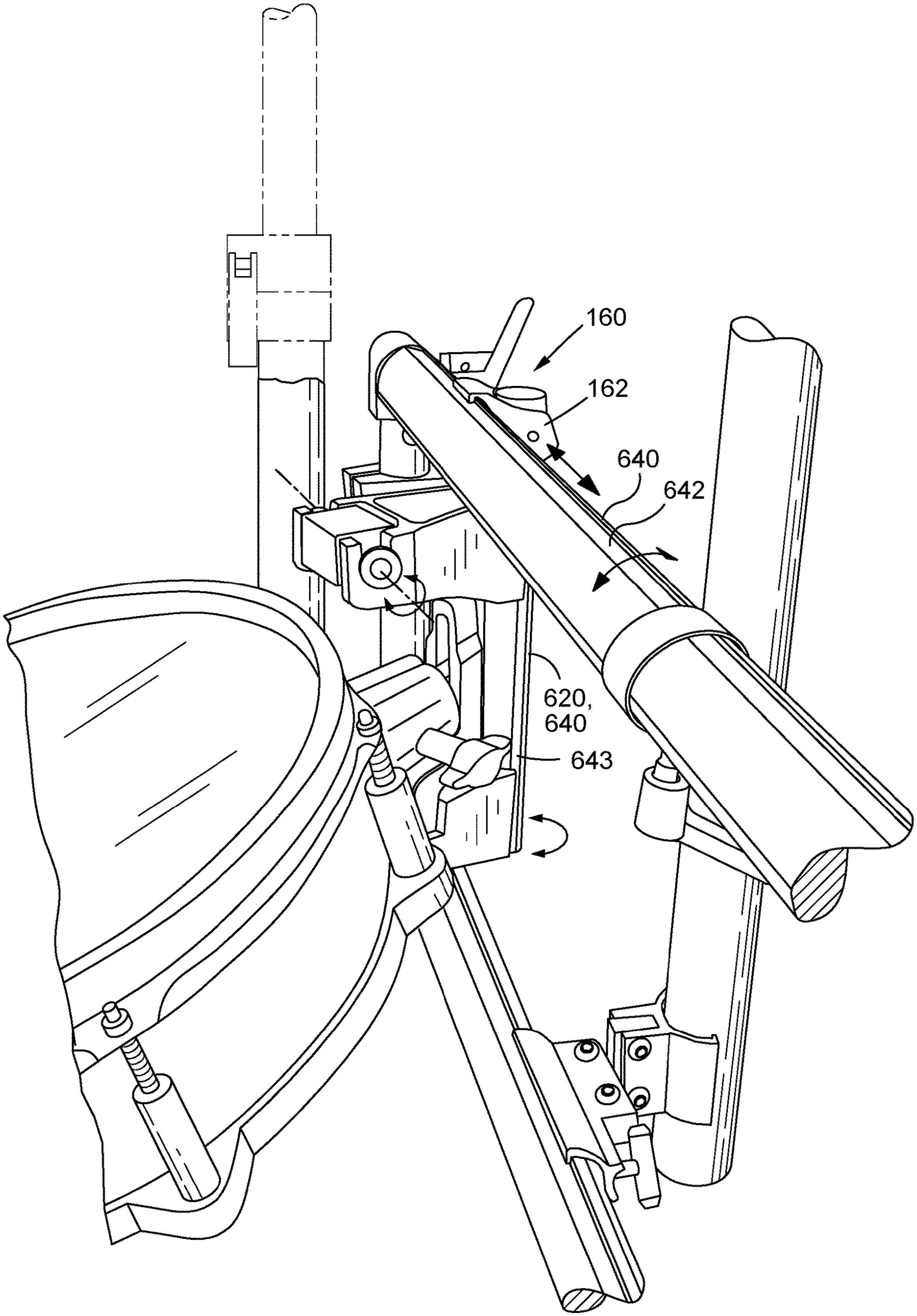
FIG. 4 is a perspective view of the percussion instrument mount mounted to the support structure according to at least one embodiment.
Figure 5:
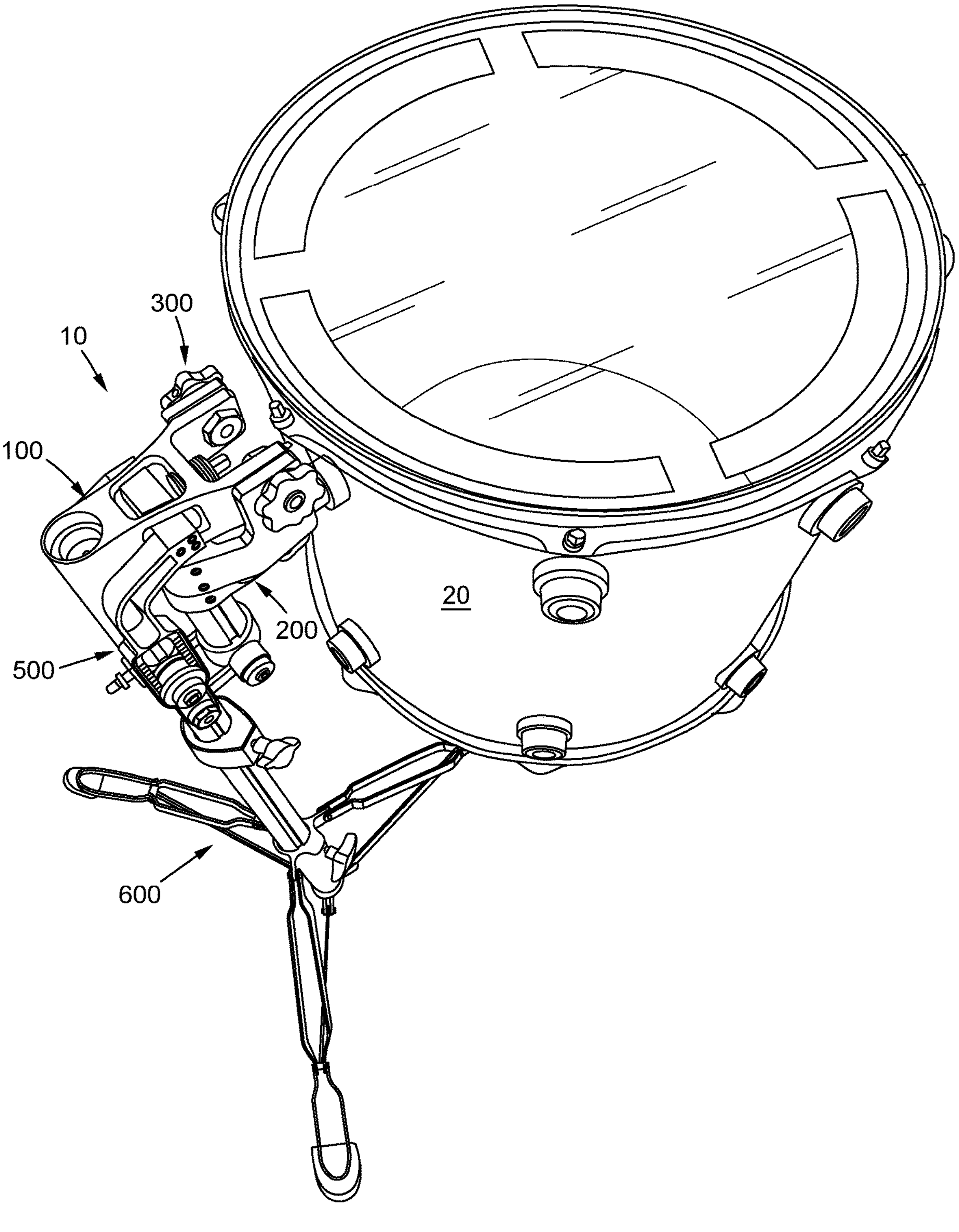
FIG. 5 is a perspective view of the acoustic percussion instrument mount mounted to the support structure according to at least one embodiment.
Figure 6:
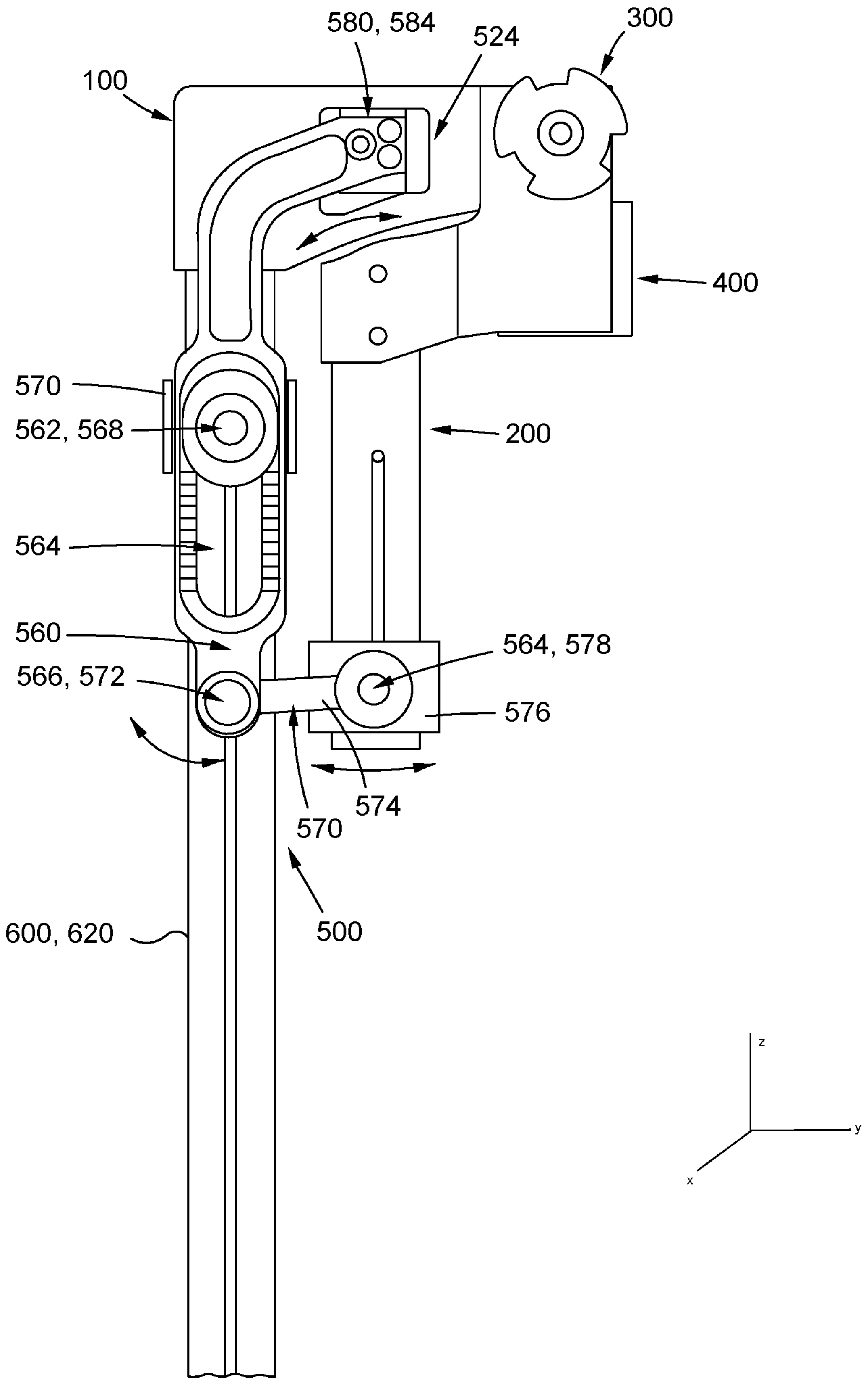
FIG. 6 is a perspective view of the percussion instrument mount mounted to the support structure according to at least one embodiment.
Figure 7:
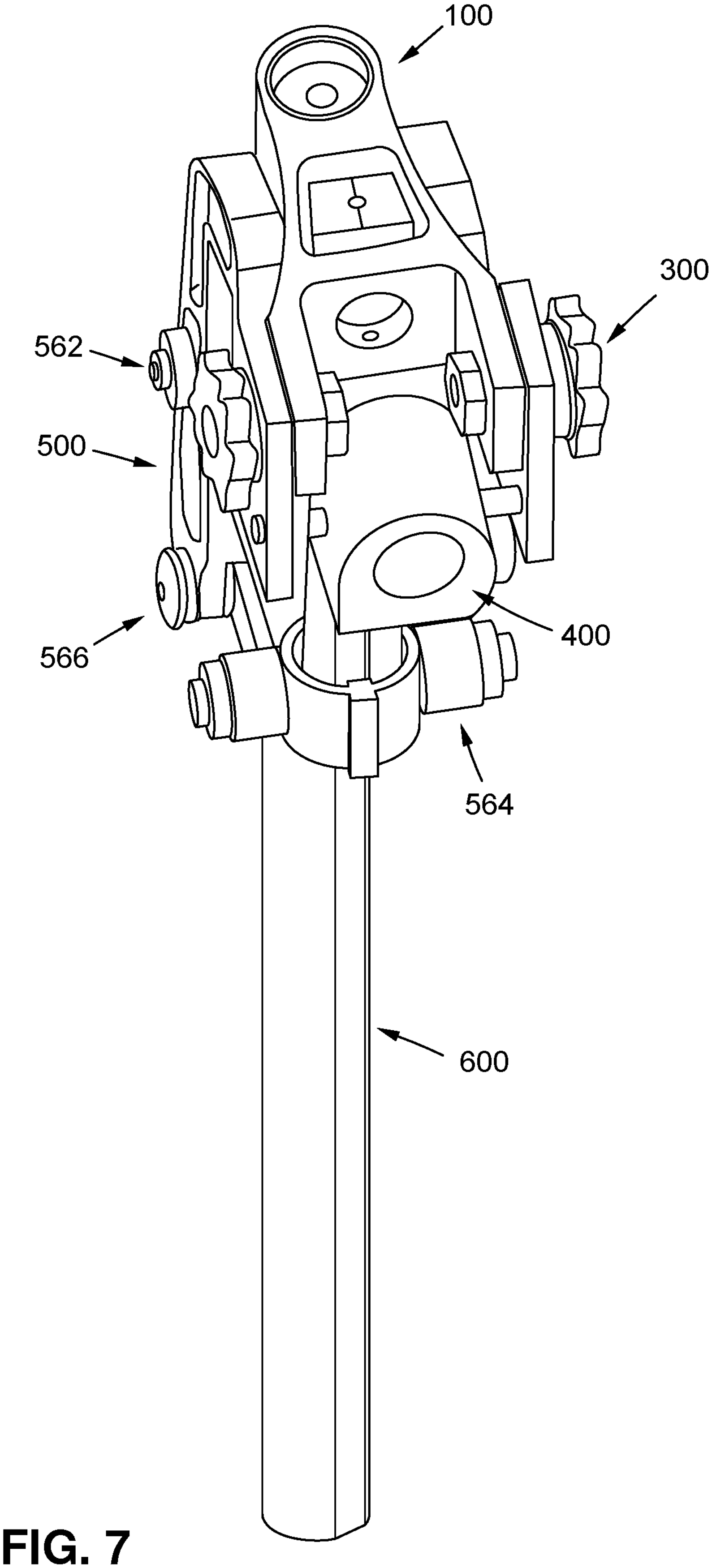
FIG. 7 is a perspective view of the percussion instrument mount mounted to the support structure according to at least one embodiment.

The third arm portion includes the instrument attachment mechanism 400, which is configured to attach the percussion instrument 20 to the swing arm 200. As shown in FIGS. 1-3, the instrument attachment mechanism 400 may comprise a slot 420 formed in the third arm portion, through which a fastener 440 secures mounting hardware 460 configured to accept the supported percussion instrument 20. Preferably, the fastener may be loosened and tightened so as to permit the mounting hardware to slide within the slot, thereby repositioning the mounting hardware with respect to the swing arm 200 and thereby adjusting the angle properties of the mounted instrument.

The second arm portion 240 extends distal to the first arm portion 220, and at least partially forms the playing impact energy absorber 500. As shown in FIGS. 1-3, the playing impact energy absorber 500 comprises at least one magnet pair 520, each magnet pair comprising a swing arm 200 magnet 522 and a base magnet 524. The at least one magnet pair is configured to impart the aforementioned magnetic restoring force, tending the swing arm 200 back towards the equilibrium position when the swing arm 200 is moved from the equilibrium position. In at least one embodiment, the at least one magnet pair includes two magnet pairs.

The magnetic restoring force may be repulsive and/or attractive. Arrangement of the respective magnets of the magnet pairs such that their like polarities face each other provides a repulsive magnetic restoring force. In operation, the weight of the instrument causes the swing arm 200 to move the swing arm 200 magnet and base arm magnet closer together than when in the equilibrium position. The repulsive magnetic force then reestablishes the swing arm 200 in the equilibrium position. Arrangement of the respective magnets of the magnet pairs such that their unlike polarities face each other provides an attractive magnetic restoring force. In operation, the weight of the instrument causes the swing arm 200 to move the swing arm 200 magnet and base arm magnet further apart than when in the equilibrium position. The attractive magnetic force then reestablishes the swing arm 200 in the equilibrium position. Accordingly, movement of the swing arm 200 away from the equilibrium position (e.g., due to playing impact) is resisted by the magnetic field caused by the at least one magnet pair, which provides the restoring force tending the swing arm 200 back towards the equilibrium position.

In at least one embodiment, the relative distance between the respective magnets of the magnet pair in equilibrium is adjustable so as to vary the repulsive/attractive forces and/or the equilibrium position. For example, the base magnet may include an outer thread that couples with an inner thread of a magnet aperture of the base 100, and a turnkey portion that facilitates a screwing motion for extending or retracting the base magnet from the magnet aperture thus altering the magnetic field (e.g., work force values).

As shown, for example, in FIGS. 4-7, the support structure comprises at least one rod having at least one longitudinal surface groove 642 formed therein. In some embodiments, a further grip element 162 couples the base 100 (or the intermediate support) to the support structure in the manner of the grip elements described herein. In at least one embodiment, the further grip element 162 is coupled to the base 100 so as to enable the base 100 to rotate about its longitudinal axis (i.e., vertical z-axis) so as to adjust the playing position of the mounted percussion instrument 20.

The at least one rod preferably forms a frame on which the percussion instrument mount 10 (and consequently, the percussion instrument 20) is mounted. Accordingly, a plurality of rods may be coupled together at various joints, which joints may be configured to permit the rods to rotate about their longitudinal axis relative to each other. The joints may further be configured to fix the rotational position of each rod. In some embodiments, frictional elements (e.g., screws) are utilized at the joint to fix the rotational position of each rod. In this manner, the playing position of the mounted percussion instrument 20 may be further adjusted.

Turning now to FIGS. 5-10, aspects of at least one alternative embodiment are shown. Structural elements having similar functions are referred to with corresponding reference numerals of the embodiments shown in FIGS. 1-4, and for the sake of brevity will be described hereinafter in terms of their functional differences.

As shown in FIGS. 5-10, the base 100 is configured to couple to the support structure. For example, in at least some embodiments, the base 100 is configured to securely receive a rod of the support structure and/or an intermediate support.

The base 100 is further coupled to the swing arm 200 via the joint 300, which preferably comprises one or more hinge joints configured to permit the swing arm 200 to swing or otherwise rotate about the joint 300 in response to the playing impact on the percussion instrument 20 coupled thereto. The hinge joints may further provide mechanical resistance so as to dissipate playing impact energy.

The swing arm 200 further includes the instrument attachment mechanism 400, which is configured to attach the percussion instrument 20 to the swing arm 200. As shown in FIGS. 5-10, for example, the instrument attachment mechanism 400 may be configured to securely accept mounting hardware via which the instrument is supportable on the mount 10.

In some embodiments (not shown) the instrument attachment mechanism 400 may be slideably coupled to the swing arm 200, either directly or via an intermediate piece, such that its longitudinal position relative to the swing arm 200 (i.e., along the z-axis) may be adjusted. Accordingly, corresponding grip elements may be utilized in the manner similarly discussed herein so as to achieve this functionality. The instrument attachment mechanism 400 may also permit rotational adjustment about the x-axis and/or the y-axis so as to adjust the playing angle and/or additionally rotate/invert the drum 180 degrees for tuning the opposing drum head of the instrument without disengaging the instrument from the attachment mechanism 400. Such adjustment may be mechanically enabled either via the direct coupling or the indirect coupling. In some embodiments, an intermediate piece is configured to couple the instrument attachment mechanism 400 to the swing arm 200, as well as to enable such adjustment.

The playing impact energy absorber 500 may comprise: a dampening arm 560 configured to rotate about an intermediate hinge point 562; a swing arm coupler 570 configured to couple the dampening arm 560 to the swing arm 200 at respective terminal hinge points 564 and 566; a magnet block 580 configured to provide the magnetic restoring force.

As shown in FIGS. 5-10, the swing arm coupler 570 preferably includes a first hinge structure 572 defining the terminal hinge point of the dampening arm 560. The first hinge structure is preferably configured to couple the terminal hinge point of the dampening arm 560 to an intermediate arm 574. The intermediate arm is in turn coupled to a swing arm sleeve 576 via a second hinge structure 578 defining the terminal hinge point of the swing arm 200.

The swing arm sleeve preferably defines a hollow that is configured to accept the swing arm 200 therein such that the sleeve may be repositioned along at least a portion of the length of the swing arm 200. Accordingly, in at least some embodiments, the swing arm 200 and swing arm sleeve employ a sliding joint configuration. It is further preferable that the position of the swing arm sleeve on the swing arm 200 is fixable via a fastener, e.g., a screw. In this manner, the bias of the dampening arm 560 may be adjusted so as to improve sound quality of the mounted instrument.

As shown in FIGS. 5-10, the dampening arm 560 further includes an elongated aperture 564 that receives a third hinge structure 568 defining the intermediate hinge point. The third hinge structure is preferably repositionable within the elongated aperture so as to adjust the intermediate hinge point, thereby compensating for different shell construction/weight sonic properties of various percussion instrument 20*s*. Accordingly, the third hinge structure preferably couples the dampening arm 560 to the support structure and/or intermediate support via a dampening arm sleeve 570. The dampening arm sleeve is structurally similar to the swing arm sleeve—except that it couples the third hinge structure to the support structure and/or intermediate support. Additionally, the variable third hinge structure regulates leverage (force) transferred to the magnet field, also effecting the equilibrium stabilization position.

As shown in FIGS. 5-10, the dampening arm 560 is further coupled to the magnet block 580 at the opposite end from the swing arm coupler 570. The magnet block 580 preferably houses at least one magnet block magnet 582 that forms part of at least one magnet pair. The base 100 houses at least one corresponding base magnet opposite the magnet block magnet, the base magnet forming the other part of the at least one magnet pair. The magnetic forces of the at least one magnet pair defines the equilibrium position for the magnet block 580 (and consequently the swing arm 200). The at least one magnet pair is accordingly configured to impart the aforementioned magnetic restoring force, tending the dampening arm 560/swing arm 200 back towards the equilibrium position when the swing arm 200 is moved from the equilibrium position. In at least one embodiment, the at least one magnet pair includes two magnet pairs. As with the previously described magnet pairs, the equilibrium distances between the individual magnets may be adjustable.

In operation the playing impact cases the swing arm 200 to rotate about the joint 300. The rotation of the swing arm 200 is then translated to the dampening arm 560 via the swing arm coupler 570, which dampening arm 560 is thereby caused to rotate about the intermediate hinge point defined by the third hinge structure. The rotation of the dampening arm 560 then forces the magnet block 580 out of the equilibrium position, which results in the magnet pair providing the restoring force to the magnet block 580. The restoring force is then translated through the corresponding counter-rotation of the dampening arm 560 and the swing arm 200. The joint 300, and optionally, one or more of the hinge structures provide mechanical and/or frictional resistance so as to further dissipate the playing energy.

Figure 8:
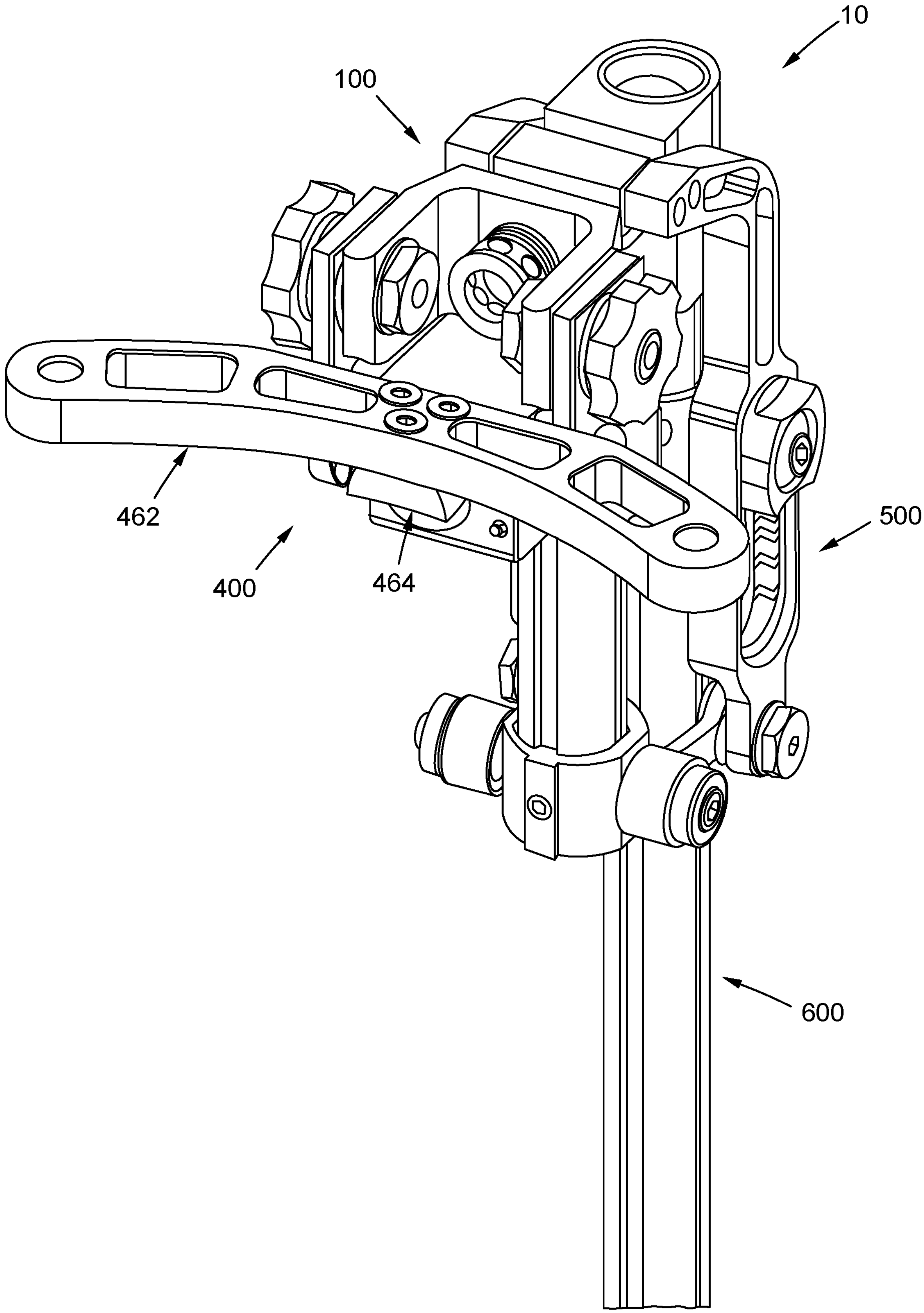
FIG. 8 is a perspective view of the percussion instrument mount according to the at least one alternative embodiment.
Figure 9:
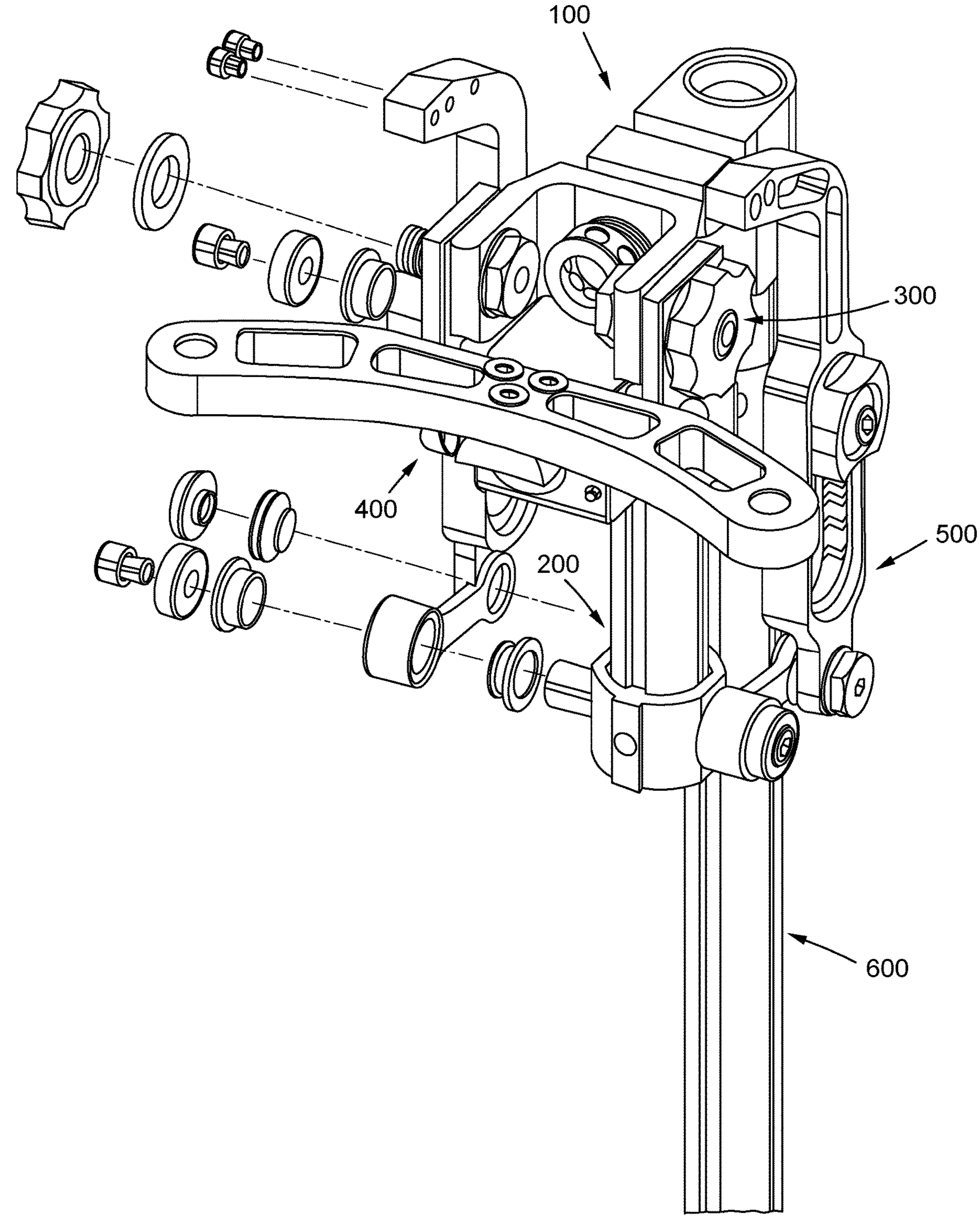
FIG. 9 is a partially exploded perspective view of the percussion instrument mount according to the at least one alternative embodiment.
Figure 10:
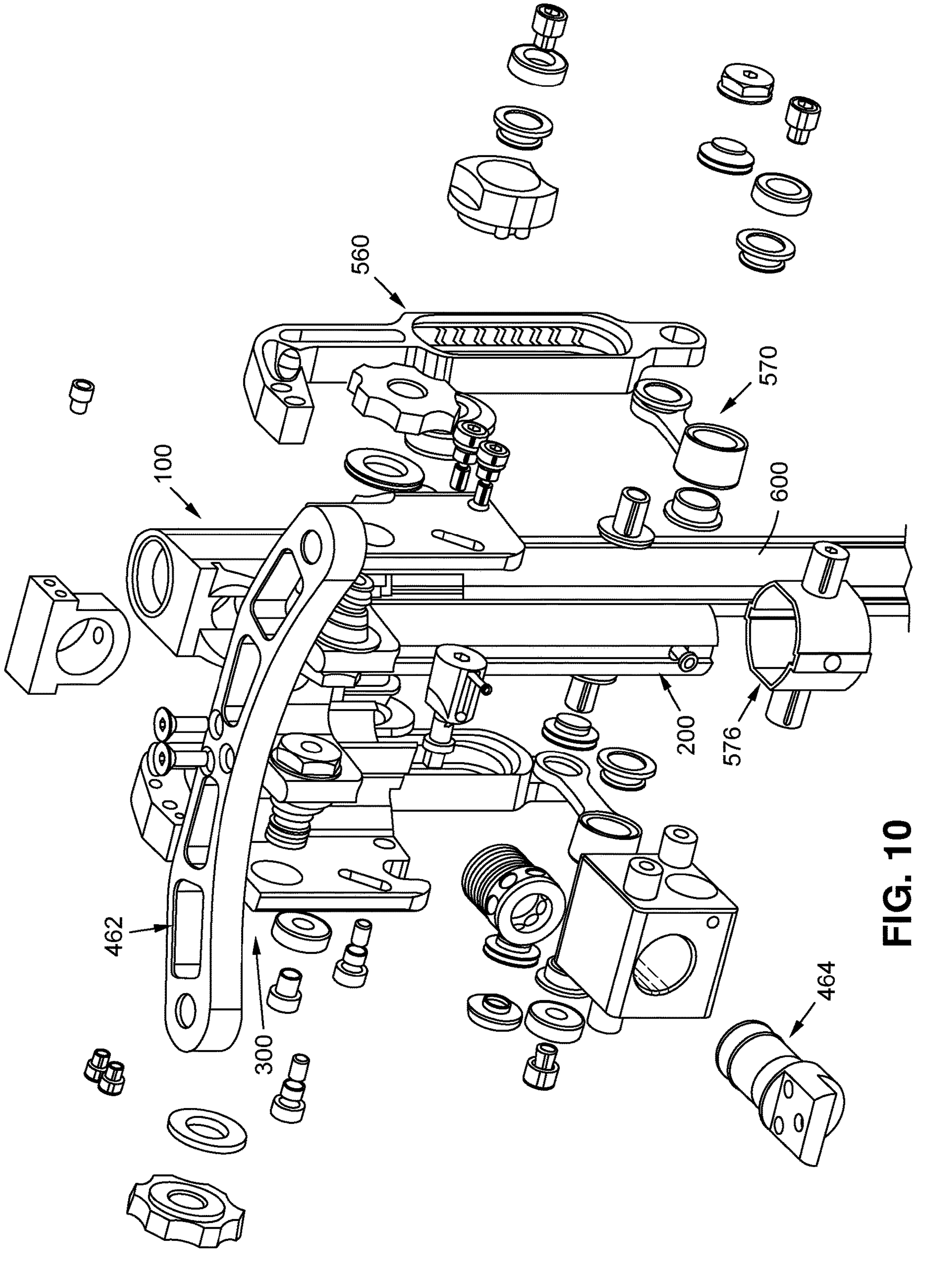
FIG. 10 is a fully exploded perspective view of the percussion instrument mount according to the at least one alternative embodiment.

As shown in FIGS. 8-10, the playing impact absorber may comprise a system in which opposing dampening arms are arranged on either side of the swing arm 200. The opposing dampening arms may each individually couple to the magnet block 580, the intermediate hinge, and the swing arm 200 in the manners described herein.

Turning now to FIGS. 9-10, in at least some embodiments, the mounting hardware is configured to rotate in a plane perpendicular to plane of rotation of the swing arm 200. Accordingly, the mounting hardware may comprise an instrument support element 462 configured to accept the instrument for support thereon. The instrument support element may, for example, comprise top and inner surfaces shaped to form a substantially flush fit with a drum exterior, as well as mounting apertures extending through the top surface and positioned so as to accept hardware components of the drum and thereby secure the drum to the instrument support element. The instrument support element may further be fixed to a rotational element 464 configured to couple the instrument support element to the swing arm 200 so as to rotate perpendicular to the plane of the rotation of the swing arm 200.

It will be understood that, although the illustrated embodiments shows hinge structures that enable the swing arm 200 swinging in a plane whereby the range of rotational motion sweeps out an arc with the second arm portion 240, the inventive concepts described herein are intended to also include alternative joint structures that permit alternative ranges of motion of swing arm 200, e.g., where the swing arm 200 sweeps out a spherical cap surface via e.g., a ball and socket joint or compound perpendicular hinge joint. Accordingly, such configurations would utilize appropriately positioned magnet pairs to set equilibrium positions and provide restorative forces. The extension of the inventive aspects described herein to such configurations is expressly contemplated.

Moreover, while the use of a magnetic restoring force is described herein, other restoring forces (e.g., spring forces, elastomer forces or combinations of dislike mechanical forces) and corresponding structures may be utilized without departing from the scope of the invention.

Figure 11:
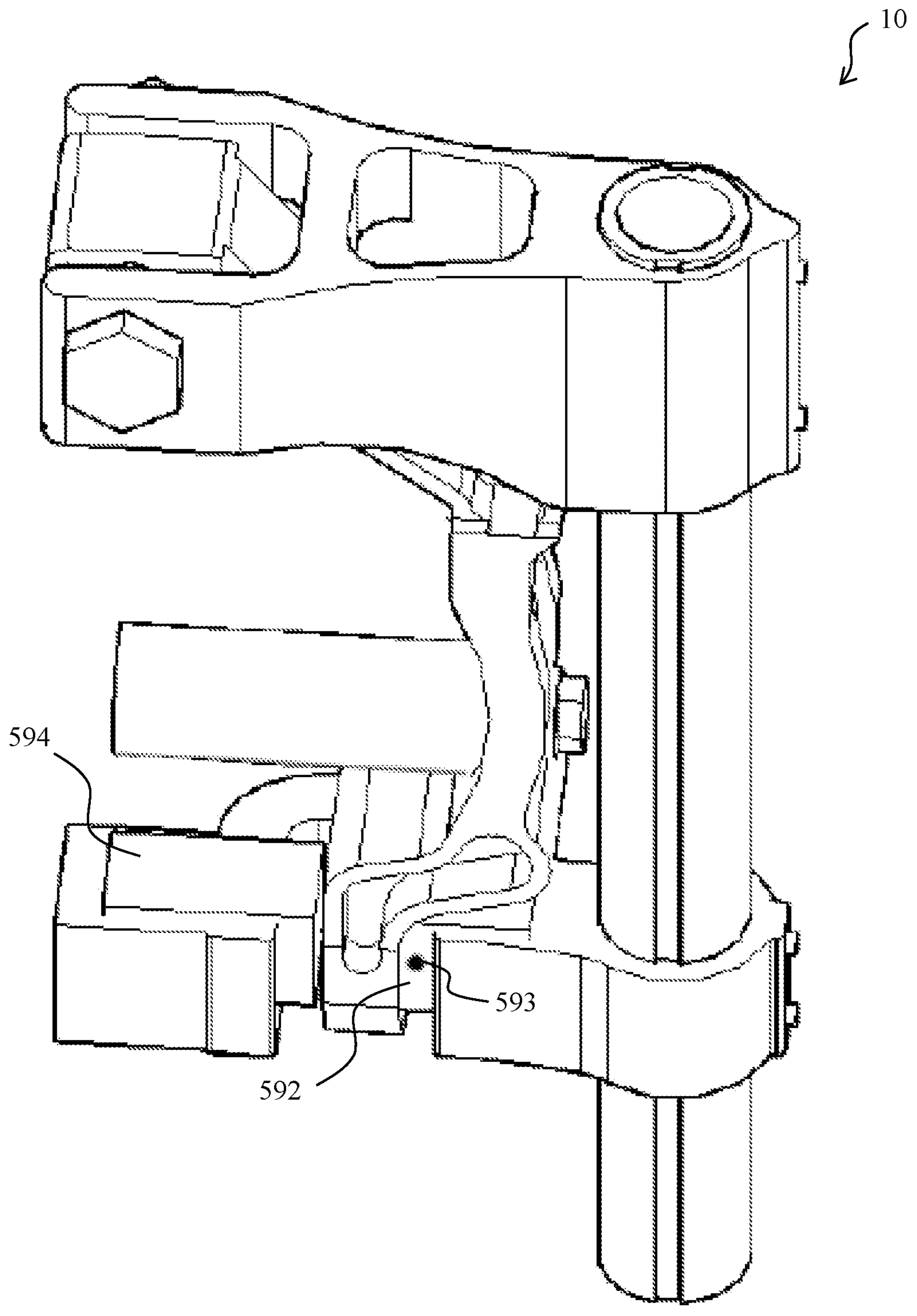
FIG. 11 is a perspective view of the percussion instrument mount according to at least one alternative embodiment.
Figure 12:
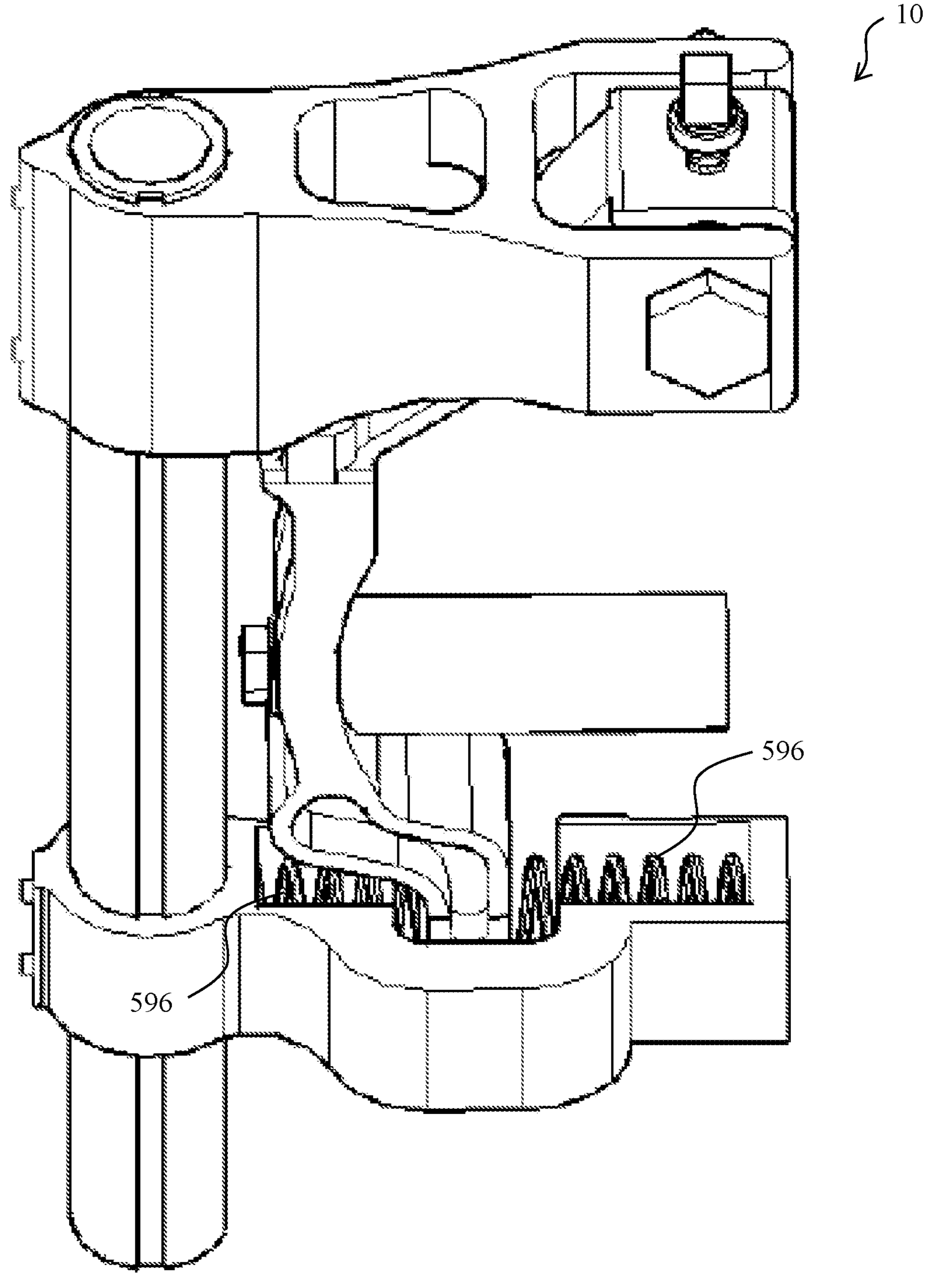
FIG. 12 is a perspective view of the percussion instrument mount according to at least one alternative embodiment.
Figure 13:
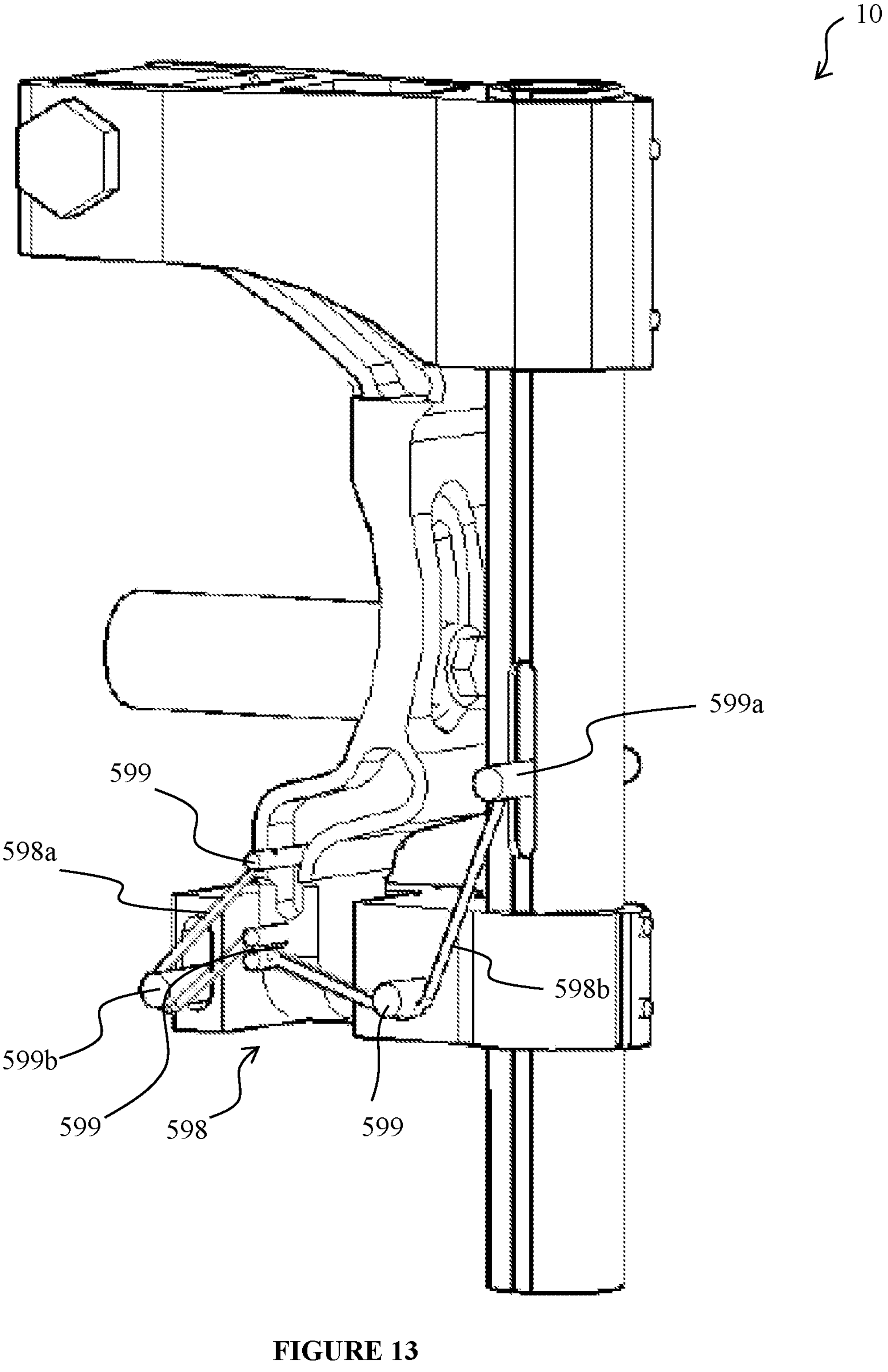
FIG. 13 is a perspective view of the percussion instrument mount according to at least one alternative embodiment.

FIGS. 11 thru 13 illustrate exemplary embodiments in which non-magnetic restoring forces are utilized in accordance with the principles described herein. The non-magnetic restoring force may be provided by one or more non-magnetic restoring elements, including: inflatable bladders (FIG. 11), foam cushions (FIG. 11), compression springs (FIG. 12), and elastic bands (FIG. 13). As with the magnetic restoring force, the non-magnetic restoring force may be repulsive and/or attractive.

The exemplary embodiments FIGS. 11 thru 13 will now be described. It will be understood, however, that similar structures and features to other embodiments will not be described again here for the sake of brevity, although one of ordinary skill in the art will understand that such descriptions are similarly applicable, where appropriate.

FIG. 11 illustrates an exemplary embodiment that includes at least an inflatable bladder 592 type restoring element. The inflatable bladder 592 may be gas or liquid inflatable via a fill valve 593, and may have an elasticity that imparts a predetermined amount of restoring force. The inflatable bladder 592 may tend the swing arm 200 back towards the equilibrium position when the swing arm 200 is moved from the equilibrium position.

FIG. 11 also illustrates a foam cushion 594 type restoring element. The foam cushion 594 may have an elasticity that imparts a predetermined amount of restoring force. The foam cushion 594 may tend the swing arm 200 back towards the equilibrium position when the swing arm 200 is moved from the equilibrium position.

FIG. 12 illustrates an exemplary embodiment that includes at least a compression spring 596 type restoring element. The compression spring 596 may have an elasticity that imparts a predetermined amount of restoring force. The compression spring 596 may tend the swing arm 200 back towards the equilibrium position when the swing arm 200 is moved from the equilibrium position.

FIG. 13 illustrates an exemplary embodiment that includes at least an elastic band 598 type restoring element. The elastic band 598 may have an elasticity that imparts a predetermined amount of restoring force. The elastic band 598 may tend the swing arm 200 back towards the equilibrium position when the swing arm 200 is moved from the equilibrium position.

As illustrated in FIGS. 11 thru 13, in some embodiments, the playing impact energy absorber 500 may include restoring elements (e.g., magnets, bladders, foam, springs, elastic bands, etc.) positioned to one or both of a load side and a stabilizing side of the swing arm 200. As used herein, the load side is the side to which the swing arm 200 initially moves in response to playing impact on the drum, and takes the initial load of the impact, whereas the stabilizing side is opposite the load side, and provides an additional restoring force.

Returning to FIG. 13, for example, in some embodiments, the elastic band type restoring element 598 may comprise a load-side elastic band restoring element 598*a* and/or a stabilizing-side elastic band restoring element 598*b*. Tension in the load-side elastic band 598*a* restoring element may be adjustably provided as follows: one end of the load-side elastic band 598*a* may be fixed to the swing arm 200; the intermediate portion of the load-side elastic band 598*a* may pulley-like engage a post 599 at the base 100; and the other end of the load-side elastic band 598*a* may be fixed to an end tensioner 599*a* in the support structure 600 (or alternatively, in the base 100). The position of the end tensioner 599*a* may be adjusted so as to increase and/or decrease tension in the load-side elastic band 598*a*. Such adjustability may be via fixedly repositioning the end tensioner 599*a* within a slide slot, or may be via fixedly rotating the tensioner to progressively wrap the load-side elastic band thereabout. In some embodiments, the post 599 may alternatively or additionally comprise an intermediate tensioner 599*b*. Tension in the stabilizing-side elastic band 598*b* may be adjustably provided in similar fashion via one or more end tensioners 598*a* and/or intermediate tensioners 599*b*. Tension (and thus the restoring force) may further be adjusted via the adjustment of the second base portion 140 along the support structure 600 via the grooves 642.

It will further be understood that the load and stabilizing sides may include the same type of restoring element, or may include different types of restoring elements. This is illustrated, for example, in FIG. 11, which shows the load side having the inflatable bladder 592 and the stabilizing side having the foam cushion 594 types of restoring elements. Although not expressly shown, any other combination of restoring elements (magnetic and/or non-magnetic) may be utilized without departing from the scope of the invention.

Figure 14:
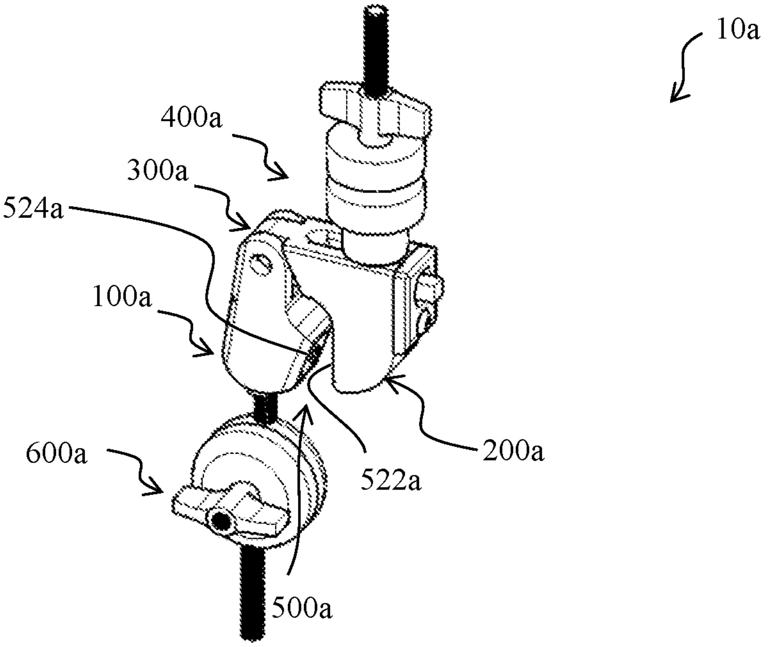
FIG. 14 is a perspective view of the percussion instrument mount according to at least one alternative embodiment.

In addition, while the mount 10 is described herein as mounting drums 20, the principles of the invention may also be applied to cymbals and other percussion instruments (not shown). FIG. 14 illustrates an exemplary embodiment in which the principles of the invention are applied to a cymbal mount 10*a*.

As shown, a base 100*a* may be coupled to a swing arm 200*a* via a joint 300*a*. The swing arm 200*a* may be configured to rotate about the joint 300*a* in response to a playing impact on the cymbal coupled to the swing arm 200*a* via a cymbal attachment mechanism 400*a*. A playing impact energy absorber 500*a* may be configured to absorb the rotation of the swing arm 200*a*. The base 100*a* is also preferably coupled to a support structure 600*a*, such as an instrument stand or kit frame, configured to support the cymbal via the percussion instrument mount 10*a* on a playing surface, e.g., the ground, stage or kit.

In accordance with the principles described herein, the impact energy absorber 500*a* preferably absorbs the playing impact by progressively dampening the swing via magnetic field resistance. In particular, the respective strengths and locations of one or more magnets 522*a*, 524*a* located in the cymbal mount 10*a* produce a magnetic field that defines an equilibrium position for the swing arm 200*a*. Movement of the swing arm 200*a* away from the equilibrium position (e.g., due to playing impact) is resisted by the magnetic field, which provides a restoring force tending the swing arm 200*a* back towards the equilibrium position. Mechanical resistance or frictional resistance may also be provided, for example at various points of rotation, so as to dissipate the playing impact energy. Accordingly, playing impact energy transferred from the cymbal to the base 100*a* is significantly reduced, if not eliminated altogether.

Moreover, similarly to the drum based embodiments described herein, other non-magnetic restoring forces (e.g., spring forces, elastomer forces or combinations of dislike mechanical forces) and corresponding structures may be utilized without departing from the scope of the invention. As with the magnetic restoring force, the non-magnetic restoring force may be repulsive and/or attractive, and may be provided by one or more restoring elements, as discussed herein.

Figure 15:
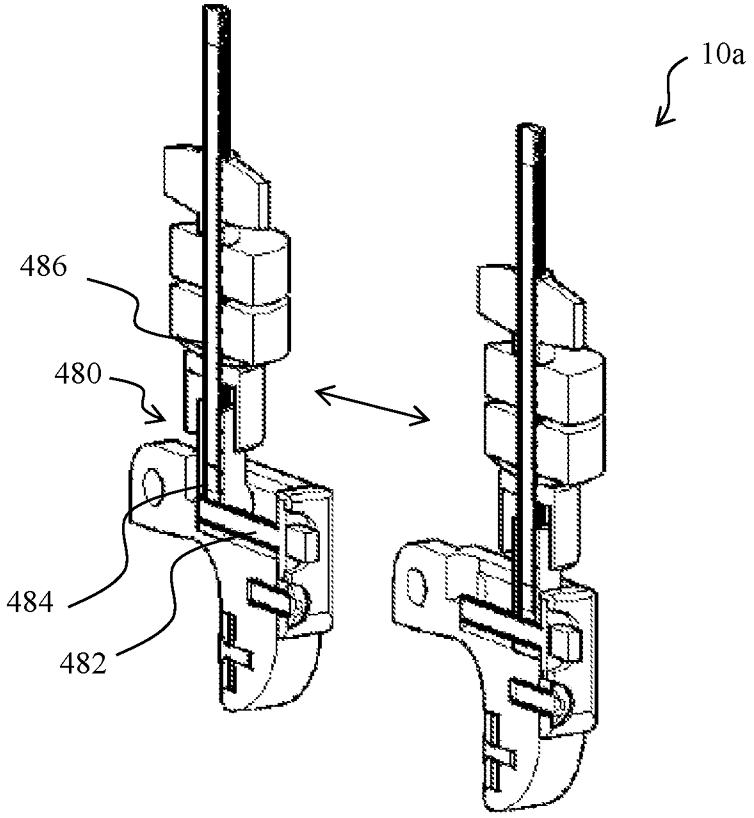
FIG. 15 is a perspective view of the percussion instrument mount according to at least one alternative embodiment.

In at least some embodiments, the cymbal mount 10*a* is configured such that the cymbal is moveable along the swing arm 200*a*, towards/away from the hinge 300*a*, so as to alter the leverage with respect to the impact energy absorber 500*a*. As shown in FIG. 15, for example, the cymbal attachment mechanism 400*a* may couple the cymbal to the swing arm 200*a* via an actuator 480. The actuator 480 may be positioned internal to the swing arm 200*a*. The actuator 480 may include a longitudinal screw portion 482 configured to freely rotate therein, as well as a threaded nut portion 484 accepting the screw portion 482 therein such that rotation of the screw portion 482, via an exposed end thereof, causes the nut portion 484 to longitudinally traverse the screw portion 482. The nut portion 484 may be coupled (integrally or non-integrally) to a central shaft 486 of the cymbal attachment mechanism 400*a*. Rotation of the screw portion 482 may therefore move the cymbal towards/away from the hinge 300*a*, altering the sonic properties of the cymbal.

Figure 16:
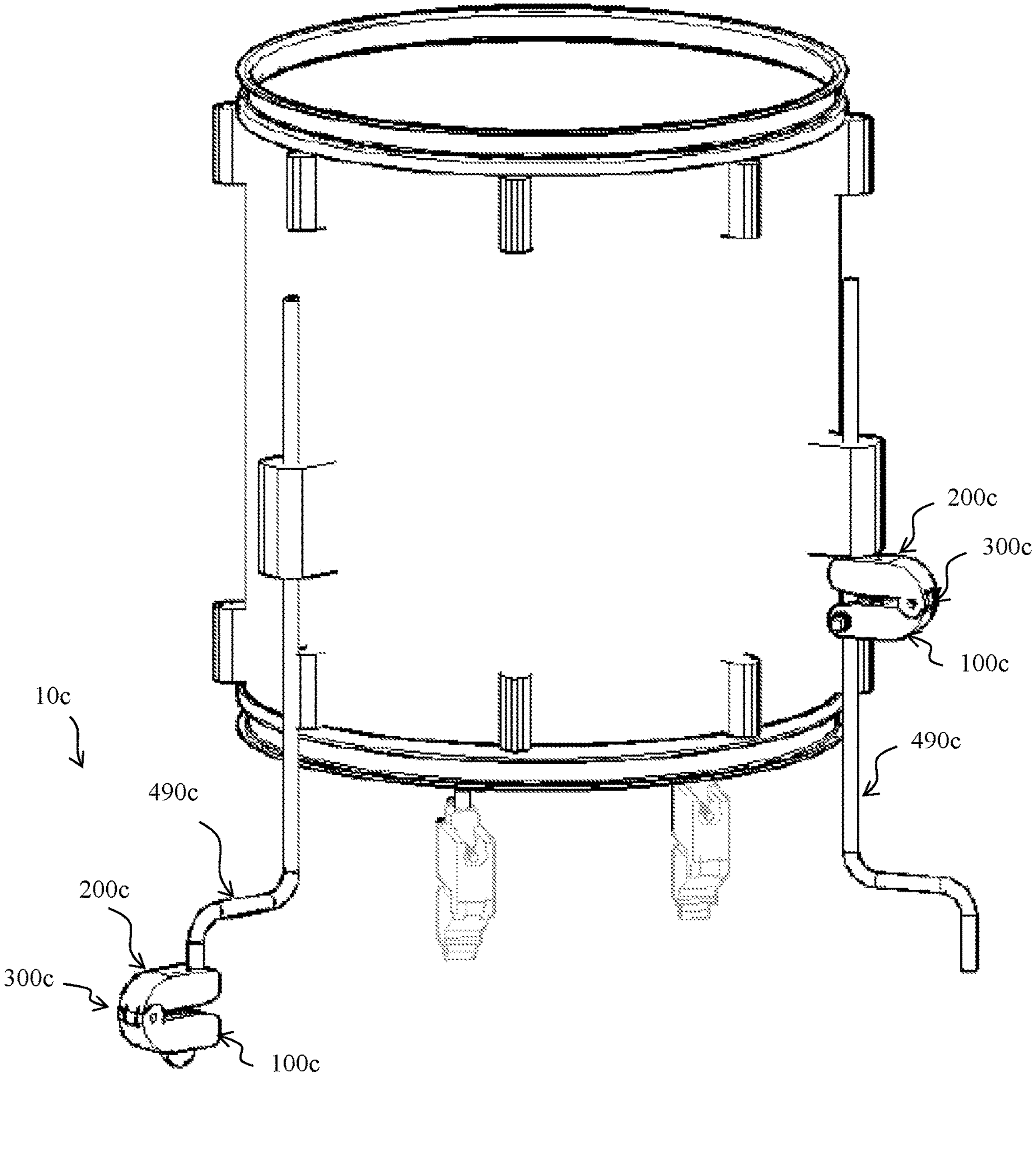
FIG. 16 is a perspective view of the percussion instrument mount according to at least one alternative embodiment.

The principles of the invention described herein may also be applied to mounting drums (or other percussion instruments) on floor legs 490*c*, as shown, for example, in FIG. 16. In such embodiments, the swing arm 200*c* and base 100*c* of the mount may comprise a clam-shell arrangement, in which, opposite the hinge 300*c*, each engages the floor leg 490*c* in a respective through aperture. The base 100*c* may fixedly engage the floor leg 490*c*, while the swing arm 200*c* freely engages the floor leg 490*c*, such that a lug (or other structural portion) of the drum rests on top of the swing arm, forcing it towards the base. Additionally or alternatively, the leg mount 10*c* may support the drum leg 490*c* on the floor, the swing arm 200*c* fixedly coupling to the drum leg 490*c* while the base 100*c* rests on the floor or other support. The restoring force may be provided by any the energy absorber utilizing one or more of the restoring elements discussed herein, or principles thereof, including magnetic and non-magnetic restoring elements, and is opposite the force exerted by the drum resting on top of the swing arm. Accordingly, the leg mount 10*c* ultimately supports the drum and absorbs the playing impact via the energy absorber.

The enabled features described in detail above are considered novel over the prior art of record and are considered critical to the operation of at least one aspect of the invention and to the achievement of the objectives of the invention. The words used in this specification to describe the exemplary embodiments are to be understood not only in the sense of their commonly defined meanings, but also to include any special definition with regard to structure, material or acts that would be understood by one of ordinary skilled in the art to apply in the context of the entire disclosure.

The definitions of the words or drawing elements described herein are meant to include not only the combination of elements which are literally set forth, but all equivalent structures, materials or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim without departing from the scope of the invention.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted in conjunction with the appended claims.

What is claimed is:

1. A percussion instrument mount, comprising:

a base that supports a percussion instrument in a playing position;

a swing arm coupled to the percussion instrument, the swing arm also coupled to the base via a joint such that the swing arm rotates about the joint from an equilibrium position in response to a playing impact on the percussion instrument; and a playing impact energy absorber that provides a restoring force to the swing arm so as to return the swing arm to the equilibrium position.

2. The mount of claim 1, wherein the playing impact energy absorber progressively dampens the swing via magnetic field resistance.

3. The mount of claim 2, wherein the magnetic field resistance is adjustable.

4. The mount of claim 1, wherein the playing impact energy absorber comprises:

at least one magnet pair, including: at least one first magnet coupled to the swing arm, and at least one second magnet coupled to the base, the magnetic pair generating a magnetic field defining the equilibrium position and providing the restoring force.

5. The mount of claim 1, the playing impact energy absorber progressively dampens the swing via elastic band provided resistance.

6. The mount of claim 5, wherein the elastic band provided resistance is adjustable.

7. The mount of claim 1, the playing impact energy absorber progressively dampens the swing via inflatable bladder provided resistance.

8. The mount of claim 5, wherein the inflatable bladder provided resistance is adjustable.

9. The mount of claim 1, the playing impact energy absorber progressively dampens the swing via foam cushion provided resistance.

10. The mount of claim 1, the playing impact energy absorber progressively dampens the swing via compression spring provided resistance.

11. The mount of claim 1, wherein the joint includes a frictional element configured to provide frictional resistance to the rotation of the swing arm.

12. The mount of claim 11, wherein the joint is a hinge joint that permits the swing arm to pivot thereabout in a two dimensional plane.

13. The mount of claim 1, further comprising mounting hardware configured to couple the percussion instrument to the swing arm.

14. The mount of claim 1, wherein the mounting hardware is configured to permit the percussion instrument to rotate about an axis perpendicular to a longitudinal axis of the swing arm.

15. The mount of claim 1, wherein the percussion instrument is an electronic percussion instrument.

16. The mount of claim 1, wherein the percussion instrument is a cymbal.

17. The mount of claim 1, wherein the percussion instrument is a tom drum.

18. The mount of claim 1, wherein the swing arm supports the weight of the percussion instrument thereon.

* * * * *